United States Patent [19]
Albrecht

[11] Patent Number: 5,010,916
[45] Date of Patent: Apr. 30, 1991

[54] CHECK VALVE

[76] Inventor: David E. Albrecht, 1383 Granary Rd., Blue Bell, Pa. 19422

[21] Appl. No.: 498,918

[22] Filed: Mar. 23, 1990

[51] Int. Cl.$^5$ .................. F16K 15/02; F16K 27/00
[52] U.S. Cl. ..................... 137/454.2; 137/543.19
[58] Field of Search ............ 137/454.2, 454.6, 533.19, 137/543.19, 515.5

[56] References Cited

U.S. PATENT DOCUMENTS

| | | | |
|---|---|---|---|
| 1,710,635 | 4/1929 | Wertz | 137/543.19 |
| 3,084,709 | 4/1963 | Flick et al. | 137/454.5 |
| 3,399,694 | 9/1968 | Vinson | 137/543.19 X |
| 3,913,615 | 10/1975 | Cooper | 137/543.19 |
| 4,362,184 | 12/1982 | Marabeas | 137/543.19 X |
| 4,911,196 | 3/1990 | Kemp | 137/454.2 X |

OTHER PUBLICATIONS

Product Specification of Inserta Products, Inc., entitled "Check Valve Slip in Type", dated 1986.

Primary Examiner—Stephen M. Hepperle
Attorney, Agent, or Firm—Frank A. Follmer

[57] ABSTRACT

A slip-in check valve is constructed of a cartridge valve body having a cage-like configuration and designed with a plurality of inlet windows providing flow passages for the flow of fluid radially outwardly from the valve seat and the inlet side of the valve member to the outer portions of the cartridge and a plurality of outlet windows providing flow passages for the flow of fluid radially inwardly from the outer portions of the cartridge to an outlet port.

10 Claims, 3 Drawing Sheets

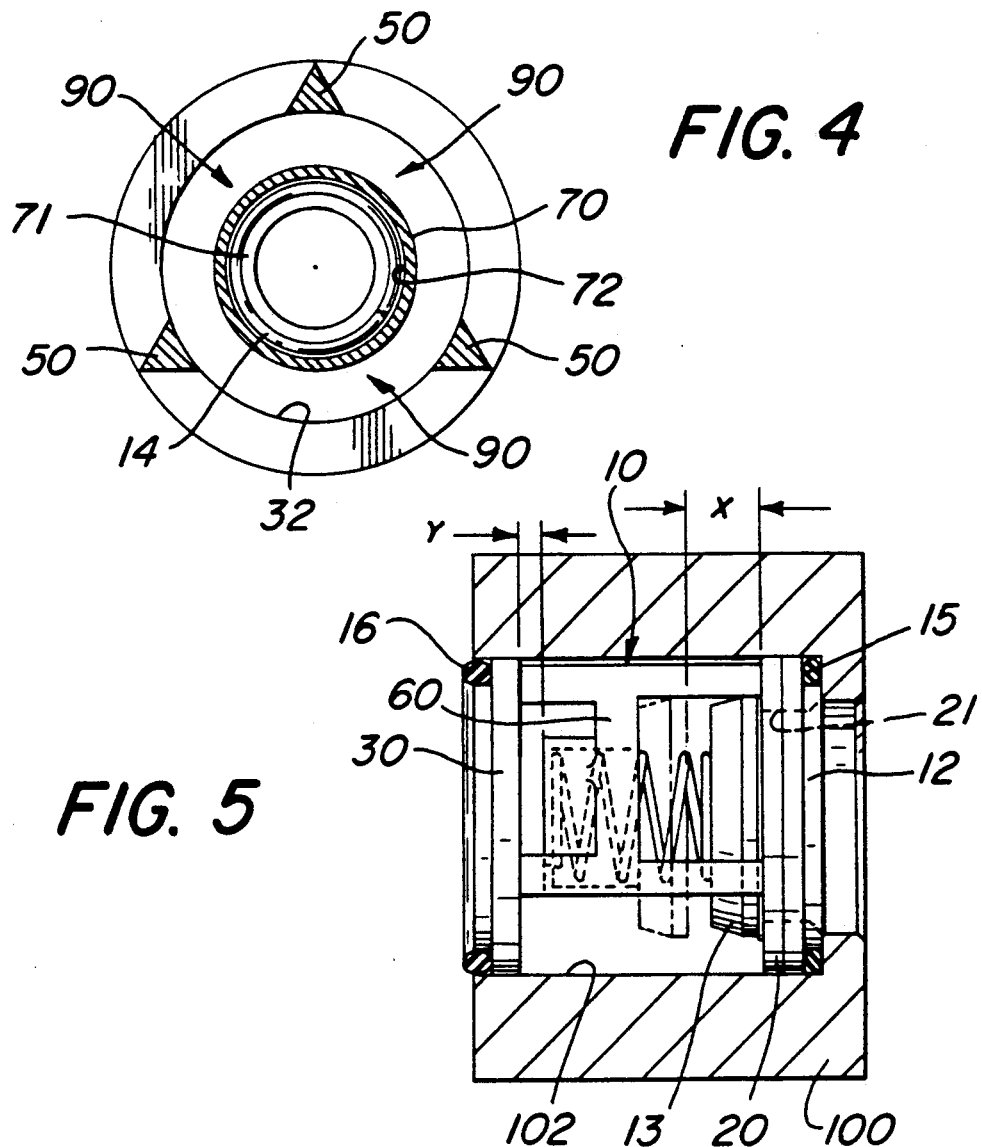
FIG. 4
FIG. 5
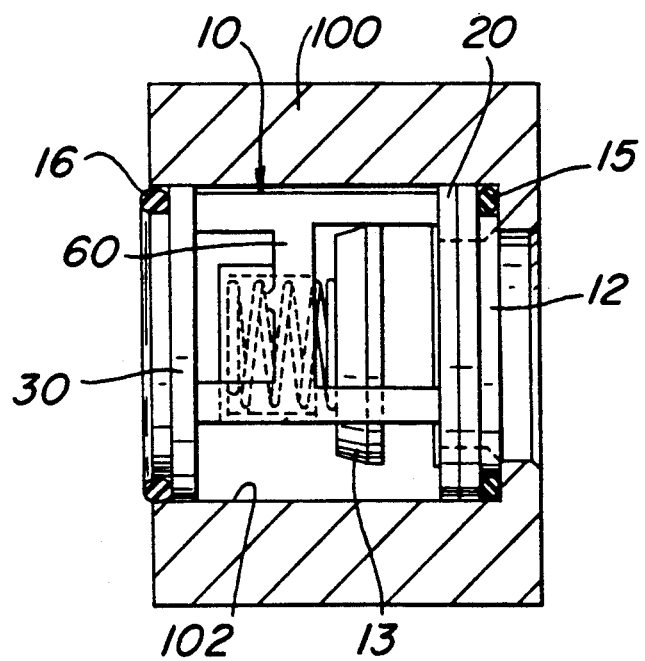
FIG. 6

CHECK VALVE

BACKGROUND AND SUMMARY OF THE INVENTION

This invention relates generally to check valves, which are direction control valves that permit flow in one direction and block flow in the opposite direction. The valving element or val ͻ member used in check valves may be of various types, including ball, poppet, disc, etc. More particularly, the invention relates to "slip-in" check valves of the type that can be slipped into place in a cylindrical bore of a flow tube or other flow component. Slip-in check valves are known and generally comprise a valve seat providing means, a movable valve member cooperable with the valve seat for controlling flow therepast, spring means for biasing the valve member toward the valve seat, and a cartridge valve body for supporting the valve seat providing means, the valve member and the spring means in their operating positions. The cartridge valve body is designed so that it is possible to change the direction of flow control by simply turning the cartridge end-for-end in the cartridge bore of the flow component. In addition, check valves of this type have been made with more sophisticated designs that will also permit flow normal to the main flow path.

While there are check valves of the indicated type known in the art, these valves have the disadvantage that they are generally expensive to manufacture in a manner that ensures the concentricity and dimensional integrity that is necessary for the proper functioning of the valve.

In accordance with the invention, there is provided a novel and improved cartridge valve body for use in a slip-in check valve of the indicated type The slip-in valve cartridge of the invention has several advantages over the prior art such as, for example, the cartridge is designed so as to provide high flow paths through a minimum dimensioned cartridge body and also the body character is such that it ensures the concentricity and dimensional integrity that is essential for successful, hassle-free cartridge installation and use. Other advantages and features of the invention will become apparent from the description hereafter.

Briefly stated, the slip-in valve cartridge in accordance with the invention is constructed of a cage-like configuration and comprises an inlet retainer portion adapted to support the valve seat providing means at the inlet end of the check valve and an outlet retainer portion defining an outlet port at the outlet end of the check valve. A valve stop portion is located between the inlet and outlet retainer portions for limiting the movement of the valve member away from the valve seat. The cartridge also comprises a plurality of inlet posts extending axially between the inlet retainer portion and the stop portion and located on the periphery of the cartridge body in circumferentially spaced apart relation. The cartridge also includes a spring retainer portion located centrally on the stop portion for supporting the spring means in its operative position. The design is such that the valve member is located on the inlet side of the stop portion and within the inlet posts so as to be guided for movement toward and away from the valve seat. The cartridge also comprises a plurality of outlet posts extending axially between the stop portion and the outlet retainer and located on the periphery of the cartridge in circumferentially spaced apart relation. There is also provided a plurality of inlet windows defined between the inlet posts to provide flow passages for the flow of fluid radially outwardly from the valve seat and the inlet side of the valve member to the outer portions of the cartridge and a plurality of outlet windows defined between the outlet posts to provide flow passages for the flow of fluid radially inwardly from the outer portions of the cartridge to the outlet port thereof.

In accordance with a feature of the invention the cartridge is made of a one-piece body which makes it easy to construct the cartridge with the concentricity and dimensional integrity that is essential for installation and use.

BRIEF DESCRIPTION OF THE DRAWINGS

FIG. 4 is a sectional view taken on line 4—4 of FIG. 2.

FIGS. 5 and 6 is a view showing the use of the check valve in accordance with the invention in a flow means with the valve member in alternate flow controlling positions.

DETAILED DESCRIPTION OF THE PREFERRED EMBODIMENTS

Figure 1:
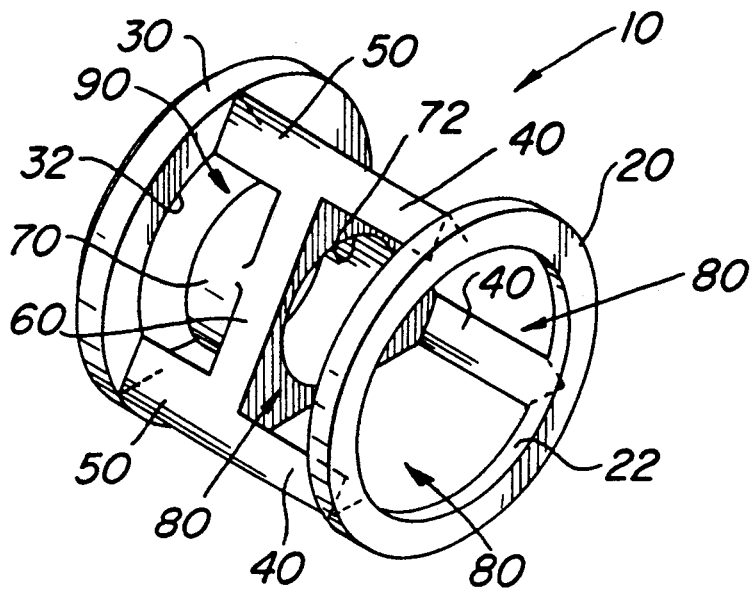
FIG. 1 is an isometric view of a cartridge body, for use in a check valve in accordance with the invention.
Figure 2:
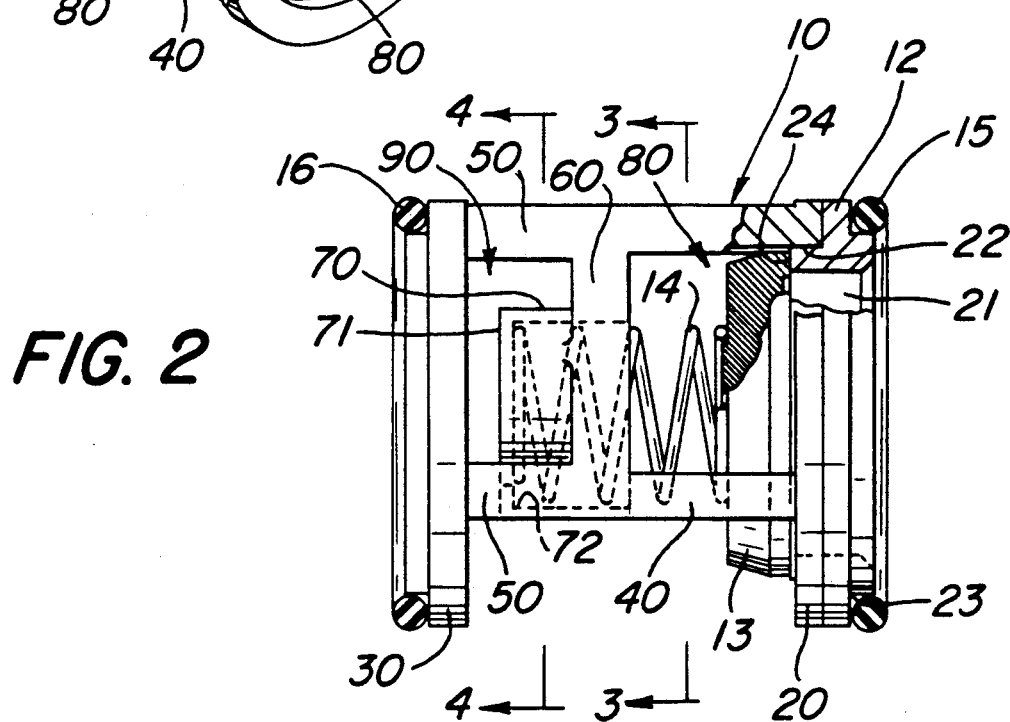
FIG. 2 is a side elevational view of a check valve in accordance with the invention.
Figure 3:
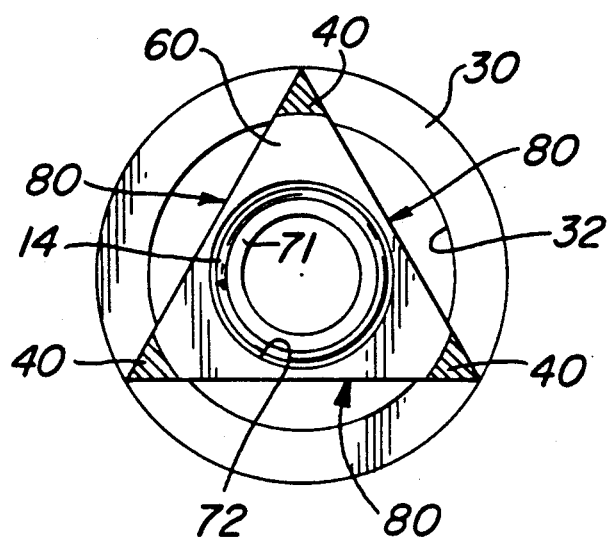
FIG. 3 is a sectional view taken on line 3—3 of FIG. 2.

Referring to FIG. 1, there is shown a cartridge valve body in accordance with the invention for use in a check valve adapted to be slipped into place in a cylindrical bore of a fluid flow component. The cartridge body is indicated at 10 and has assembled therewith an annular valve seat providing means 12, a disc-like valve member 13, a spring 14, and a pair of O-ring seals 15 and 16.

The cartridge body 10 has a cage-like configuration and includes an annular inlet retainer portion 20 adapted to support the valve seat providing means 12 at the inlet end of the check valve. The inlet retainer portion 20 has a cylindrical central rim 22 adapted to receive with a press fit the annular valve seat providing means 12. The valve seat providing means 12 defines a circular inlet port 21, has a recess 23 at its outer end adapted to receive O-ring seal 15 and provides an inwardly facing annular valve seat at 24, as is apparent from the Drawings.

Cartridge body 10 also comprises an annular outlet retainer portion 30 defining a circular outlet port 32 at the outlet end of the check valve. The outlet retainer portion 30 is spaced axially away from the inlet retainer portion 20.

Extending between the spaced apart inlet retainer portion 20 and the outlet retainer portion 30 are three spaced apart inlet posts 40 and three spaced apart outlet posts 50, which are arranged, when viewed in cross-section, in a triangular configuration at peripheral locations of the cartridge 10. To this end, the inlet and outlet posts 40 and 50 are in alignment and are circumferentially equally spaced around the associated inlet and outlet retainers 20 and 30, respectively. Also, located in axially spaced relation from said inlet and outlet retainers 20 and 30 is a triangular-shaped valve stop portion 60. As is apparent from the Drawings, the arrangement is such that the inlet posts 40 extend axially between the inlet retainer portion 20 and the stop portion 60 and the outlet posts 50 extend axially between the outlet retainer portion 20 and the stop portion 60.

It will be apparent that the stop portion 60 serves to limit the movement of the valve member 13 away from the valve seat 24. Thus, the fully open position of valve member 13 is shown in FIG. 5 in dashed lines, the closed (flow checking) position being shown in solid lines.

There is also provided a spring retainer 70 which is centrally located on the stop portion 60 to extend axially therefrom toward the outlet retainer portion 30. The spring retainer 70 has a generally cup-shaped recess 72 so as to receive a coiled compression spring 74 which is positioned to bias the valve member 13 toward the valve seat 24 as is apparent from the Drawings. Spring 74 seats on the annular bottom 71 of spring retainer 70. It is noted that the valve member 13 is in the shape of a disc and is guided by the inlet posts 40 in its movement between the valve closed (flow checking) position and a valve open position, such as the partially open position shown in FIG. 6 or the fully open position shown in dashed lines in FIG. 5.

The cartridge 10 is constructed to provide three inlet windows 80 which are defined between the inlet posts 40 to provide flow passages for the flow of fluid radially outwardly from the valve seat 24 and the inlet side of the valve member 13 to the outer portions of the cartridge 10. The windows 80 are defined at their lateral sides by the stop member 60 and the inlet retainer 20 and have a generally rectangular configuration as is apparent from the Drawings.

There are also provided three outlet windows 90 which are defined between the outlet posts 50 to provide flow passages for the flow of fluid radially inwardly from the outer portions of the cartridge 10 to the outlet port 32. The lateral sides of the outlet windows 90 are defined by the stop member 60 and the outer retainer 30 and have a rectangular configuration as is apparent from a consideration of the Drawings.

The cartridge body 10 is made of a one-piece construction whereby it can be made by cost effective machining methods and still achieve the concentricity and dimensional integrity that is essential. Thus, the various internal cylindrical bores and the external cylindrical surfaces can be made very precisely and to be concentric with one another by cost effective machining procedures.

Furthermore, the cage-like configuration, including the windows 80 and 90 provide an open design permitting high open flow paths through a minimum dimensioned cartridge body 10.

FIG. 5 shows the assembly of the check valve in accordance with the invention in a fluid flow component, namely, a flange 100, with the flow being checked in the direction from right to left through the cylindrical bore 102 in the flange 100. It is noted that there is shown but one seal to seal both the outside and the face of the check valve. It will be apparent that the geometry could be modified to employ an independent seal for each surface if desired.

Figure 7:
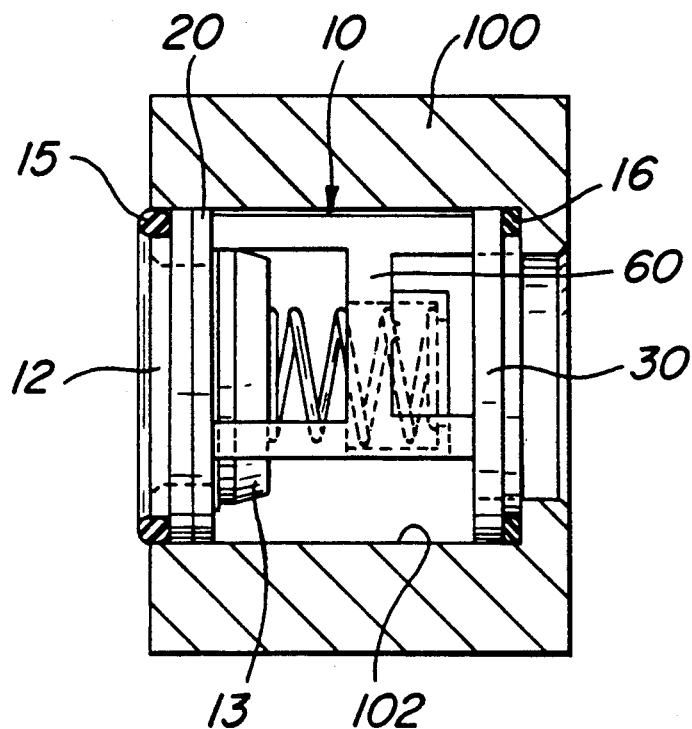
FIG. 7 is a view showing the use of the check valve in accordance with the invention for checking flow in the opposite direction to that shown in FIGS. 5 and 6.

In FIG. 7 there is shown the assembly of the check valve in accordance with the invention in flange 100 with the flow being checked in the opposite direction to that shown in FIG. 5, i.e., the flow is checked in the direction from left to right in FIG. 7.

Figure 8:
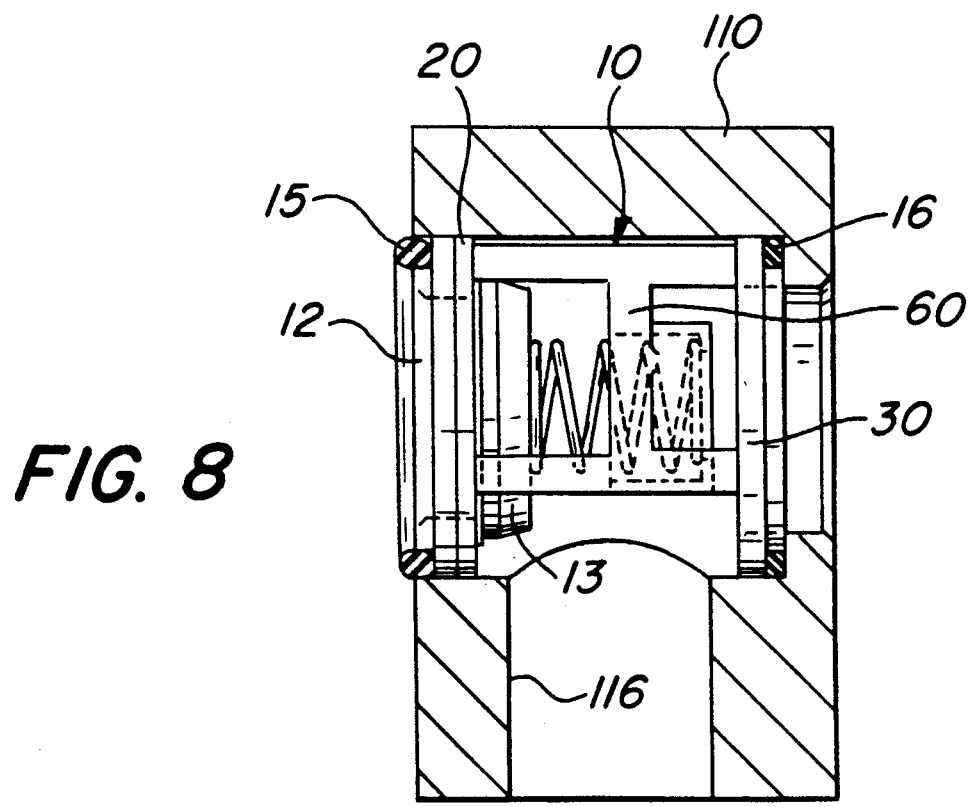
FIG. 8 is a view showing the use of the check valve in accordance with the invention with another type of flow means.

In FIG. 8 there is shown the assembly of the slip-in valve in accordance with the invention, in a flow component 110 which includes, in addition to a straight through flow path that is the main flow, a passage 112 providing a flow path normal to the main flow. This illustrates the ability of the check valve in accordance with the invention to accommodate effectively angular flow porting to the main flow path.

The novel design of the cartridge valve body in accordance with the invention results in a very compact cartridge body that provides large flow passages throughout the body to thereby result in minimum restriction and pressure flow losses. Further, the one-piece construction of the body that incorporates both the inlet and outlet retainers assures cost effective achievement of the concentricity and dimensional integrity that is so important in slip-in valve construction.

The minimum, optimum dimensions for a check valve cartridge body in accordance with the invention is achieved normally where the body minimizes the restriction to flow throughout the entire flow path thereof. The following mathematical analysis shows how this is accomplished in a very compact and effective slip-in cartridge check valve module. The check valve construction shown in FIGS. 5 and 6 will be used to demonstrate this analysis which will be started with the flow through the valve seat's inner flow diameter. The analysis will then proceed through the continuous flow path all the way to the cartridge body outlet and with each section being sized to assure unrestricted flow area passage.

The flow area of the entrance flow port to the valve is based on the inner flow diameter $D_i$ of inlet port 21 and is equal to:

$$A_i = \frac{\pi D_i^2}{4}$$

where $A_i$ equals the inlet flow area, $\pi = 3.1416$, and $D_i$ is equal to the diameter of the inlet flow port 21.

In order to have the same area or a greater area for fluid flow to radially flow out between the valve seat 24 and the valve member 13 requires that the valve member 13 move away from the valve seat a distance of "x" which is shown in FIG. 5.

This dimension "x" is derived from the following equations:

$$x \pi D_i \geq \frac{\pi D_i^2}{4} \text{ or } x = \frac{D_i}{4}$$

This equation shows that it will be necessary to place the check valve stop portion 60 at a distance that will permit the valve disc 13 to open a minimum distance of $$\frac{D_i}{4}$$

to eliminate a flow area restriction.

As the flow moves radially out, its area is increasing so that the radial projected post area may not cause a restriction. However, the radial projected area must be checked to assure that it is equal to or greater than $$\frac{\pi D_i^2}{4}$$

The inlet and outlet posts 40 and 50 each have area that reduces the longitudinal flow area, and each of these can be of various areas. However, in this analysis we will make them all the same area and will use the following in our equations:
$A_p$=Area of a Post
$N_i$=Number of Inlet Posts
$N_o$=Number of Outlet Posts The area of the inlet posts 40 and the outlet posts 50 must be calculated from the actual geometry developed from the center cutout sections employed. Therefore, the total inlet or outlet post areas will be equal to the number of posts multiplied by the area of inlet or outlet posts, respectively.
$A_b$=the area of the bore in the component that the cartridge body 10 slips into.
This is equal to:

$$A_b = \pi \frac{D_b^2}{4}$$

Where:
$D_b$=Diameter of bore that cartridge body slips into.
$A_d$=the projected area of the valve disc.
This is equal to:

$$A_d = \pi \frac{D_d^2}{4}$$

Where: $D_d$=Diameter of the disc.
From this data, it is possible to determine if $A_b$ is large enough to eliminate fluid flow area restrictions by employing the following equation (where $N=N_o+N_i$):

$$A_b - A_d - NA_p \geq \pi \frac{D_i^2}{4}$$

This equation can also be used to determine the minimum cartridge slip-in bore to eliminate flow area restrictions here.

The stop 60 has a projected area which we will call $A_s$. To permit unrestricted flow area, this section should meet the conditions of the following equation:

$$A_d \geq A_s$$

Between the inlet posts 40, the inlet retainer 20 and the stop 60 is formed flow windows 80. Likewise, between the outlet posts 50, the outlet retainer 30 and the rear of the stop 60 is formed flow windows 90. These flow windows 80 and 90 can be easily sized to eliminate any flow restricting area. However, one must take into consideration the flow window area lost by the check valve disc 13 when one calculates the total effective inlet window area.

$A_o$ is the outlet retainer area calculated from the retainer's major inside diameter $D_o$. However, this area may be restricted by the extension of the spring retainer 70 into this area. In the worst case, the spring retainer 70 would extend to the outlet retainer's rear face. In this case the area of the spring retainer extension would have to be subtracted from the major flow area of the outlet retainer to determine if enough flow area is provided to eliminate flow area restriction here. The following equation can be used to insure that there is no flow restriction in this case.

$$A_o - A_R \geq \pi \frac{D_i^2}{4}$$

where $A_R$ is the area of the spring retainer 70 that extends into the outlet port 32.

When the spring retainer 70 does not extend into the outlet port, such as is the case with the embodiment shown in the Drawing and FIGS. 1-4, there is additional area available for fluid flow to the outlet port whose diameter is $D_o$, and this area must be added in the above equation, wherefore the following equation can be employed in this case:

$$A_o - A_R + (\pi D_R y) \geq \pi \frac{D_i^2}{4}$$

In the above formula $D_R$ is the diameter of the spring retainer 70 and "y" is the distance between the end of the spring retainer 70 and the front side of the outlet retainer 30 as is shown in FIG. 5.

By calculating and sizing all of the flow areas through the valve body cartridge of the invention as shown by the above analysis, one can design a compact, minimum flow restriction slip-in valve cartridge assembly. It will be apparent that it is possible to increase or decrease various flow areas through the valve body cartridge of the invention to fine tune its characteristics for a given application.

What is claimed is:
1. In a slip-in check valve adapted to be slipped into place in a cylindrical bore of a fluid flow component for controlling axial flow through said bore, said check valve having an annular valve seat providing means, a movable valve member cooperable with said valve seat for controlling flow therepast, spring means for biasing said valve member toward said valve seat, and a cartridge valve body for supporting said valve seat providing means, said valve member, and said spring means in their operating positions, the improvement comprising:
   said cartridge having a cage-like configuration and including
   an inlet retainer portion adapted to support said valve seat providing means at an inlet end of the check valve,
   an outlet retainer portion defining an outlet port at an outlet end of the check valve and spaced axially away from said inlet retainer portion,
   said valve seat providing means, said inlet retainer and said outlet retainer each having cylindrical wall portions of the same outer diameter which fits slidably within said cylindrical bore so that said cartridge and valve seat providing means can be slipped into said cylindrical bore to be concentric therewith.
   a valve stop portion located between said inlet and outlet retainer portion for limiting the movement of said valve member away from said valve seat,
   a plurality of inlet posts extending axially between said inlet retainer portion and said stop portion in circumferentially spaced apart relation, a spring retainer centrally located on said stop portion for supporting said spring means in its operative position, said valve member being located on the inlet side of said stop portion and within said inlet posts for movement toward and away from said valve seat, a plurality of outlet posts extending axially between said stop portion and said outlet retainer in circumferentially spaced apart relation.

a plurality of inlet windows defined between said inlet posts to provide flow passages for the flow of fluid radially outwardly from said valve seat and the inlet side of said valve member to the outer portions of said cartridge, and a plurality of outlet windows defined between said outlet posts to provide flow passages for the flow of fluid radially inwardly from the outer portions of said cartridge to said outlet port, said stop portion having peripheral wall portions spaced radially inwardly from the outer portions of said cartridge to cooperate with said cylindrical bore to provide flow passages for the flow of fluid axially from said inlet windows to said outlet windows within the outer diameter of said cartridge.

2. In a check valve according to claim 1 wherein said cartridge is made of a one-piece body.

3. In a check valve according to claim 2 wherein there are provided three inlet posts, three outlet posts, three inlet windows and three outlet windows circumferentially equally spaced and lying in planes defining a triangular configuration, opposite lateral sides of said inlet windows being defined by said inlet retainer and said stop portion, opposite lateral sides of said outlet windows being defined by said outlet retainer and said stop portion.

4. In a check valve according to claim 1 wherein said outlet retainer portion is provided with an annular recessed portion and including an O-ring seal received in said recessed portion.

5. In a check valve according to claim 4 wherein said inlet retainer portion is provided with an annular recessed portion, and including an O-ring seal received in said last-named recessed portion.

6. In a check valve according to claim 1 wherein said spring retainer portion extends beyond the downstream side of said valve stop portion toward said outlet port.

7. In a check valve according to claim 6 wherein said spring retainer portion comprises a cup-shaped extension from said step portion and is located internally of said outlet windows.

8. In a check valve according to claim 2 wherein said spring retainer portion extends beyond the downstream side of said valve stop portion toward said outlet port.

9. In a check valve according to claim 7 wherein said spring retainer portion comprises a cup-shaped extension from said stop portion and is located internally of said outlet windows.

10. In a check valve according to claim 1 wherein said stop portion has a triangular shaped cross-section, said peripheral wall portions of said stop portion forming the side legs of said triangular shape thereof.

* * * * *